United States Patent [19]

Anderson

[11] Patent Number: 5,330,227
[45] Date of Patent: Jul. 19, 1994

[54] STORABLE TRUCK BED WEIGHTS FOR IMPROVED TRACTION AND HANDLING

[76] Inventor: Alger J. Anderson, 3306 North Riverwood Dr., Twin Lake, Mich. 49457

[21] Appl. No.: 194

[22] Filed: Jan. 4, 1993

[51] Int. Cl.⁵ ............................................. B60R 27/00
[52] U.S. Cl. ................................... 280/759; 296/37.6; 296/39.2
[58] Field of Search ............... 280/759, 757; 296/37.6, 296/39.1, 39.2; 114/121, 122

[56] References Cited

U.S. PATENT DOCUMENTS

| | | | |
|---|---|---|---|
| 2,993,721 | 7/1961 | Bowman | 293/67 |
| 4,190,281 | 2/1980 | Chandler | 296/37.6 |
| 4,339,142 | 7/1982 | Tanner et al. | 280/759 |
| 4,482,169 | 11/1984 | Yim | 280/759 |
| 4,688,823 | 8/1987 | Hanses | 280/759 |
| 4,733,898 | 3/1988 | Williams | 296/37.6 |
| 4,796,914 | 1/1989 | Raynor | 280/757 |
| 4,902,038 | 2/1990 | Grover | 280/759 |
| 4,971,356 | 11/1990 | Cook | 280/759 |
| 5,172,953 | 12/1992 | Chamberlain | 280/759 |

Primary Examiner—Richard M. Camby
Attorney, Agent, or Firm—Basile and Hanlon

[57] ABSTRACT

An apparatus for providing weight over the driven wheels of a motor vehicle. The apparatus includes a plurality of elongated containers for holding material. The material provides adjustable weight to the vehicle. The containers are installed on the floor of a normal cargo area of the vehicle. Also included are removable end covers located at one or both ends of the elongated containers for filling and emptying the containers with weighted material. A bracket is provided for holding the elongated containers with their installed end covers onto the floor of the vehicle to prevent movement of the containers with respect to the floor.

17 Claims, 1 Drawing Sheet

STORABLE TRUCK BED WEIGHTS FOR IMPROVED TRACTION AND HANDLING

BACKGROUND OF THE INVENTION

The present invention generally relates to storage containers and, more particularly, is concerned with material holding containers for use in floor areas of normal storage compartments of motor vehicles to add weight for improved traction and handling and provide a contained storage space.

Vehicles designed for carrying cargo are engineered for optimum handling when loaded to capacity. Unfortunately, however, traction and handling problems can occur as the result of insufficient weight over the vehicle's power driven wheels. In response to this problem, weight bearing substitutes for carrying cargo have been used to improve vehicle performance when not loaded.

Many owners of these vehicles have responded to these problems by using sandbags, bricks or other bulky materials to weigh down cargo areas. These methods, however, while providing the weight needed for these vehicles, take up much needed space in the cargo areas and tend to shift weight when they move around the area. Moreover, the loose material can fall out or even become dangerous projectiles in the event of a sudden stop or accident. These methods are clearly poor alternatives. Other devices similar to the present invention have been introduced to the public, but none fully address the vehicle owners' needs.

One type of device has been introduced which uses a ballast chamber similar to the present invention. The device uses ballasts for liquid containment only, which run the length of the pick-up truck bed and are incorporated with a truck bed liner as a single unit. The device also provides for filling and draining of the lining device. Generally, the device is intended as a permanent year-round accessory for the truck bed. Although the device provides a product for vehicle bed protection and added weight, it has serious drawbacks.

One major drawback of the device and other variations of it is that it is limited to containing liquid. Using liquid in the device can lead to a hydraulic thrust caused by abrupt movement of the water within the chamber during sudden acceleration or deceleration or sharp turning of the vehicle resulting in unpredictable movement of the vehicle while being driven. This effect could be lessened by completely filling the ballast chambers, however, doing so renders the product's weight unadjustable. Furthermore, using liquid in a ballast in cold weather requires agents to lower the fluid's freezing point. These agents being typically expensive and toxic, the truck owner would be required to store or properly dispose of the agent when emptying the ballast to adjust the ballast weight and buy more agent when refilling.

Another drawback is that the device cannot be easily removed and stored. It is intended as a permanent accessory and is too bulky and heavy to remove and store whether full of fluid or empty. This problem has been addressed in other devices by designing the device in sections, but the single filling and single draining valves of this unified ballast system requires a unified and water-tight ballast. Finally, the device is not versatile. It must be redesigned for different cargo areas different vehicles and is thus more expensive to produce than would a device that is adjustable to different cargo areas.

Other devices have been introduced disclosing removable weights that connect on the floor of a pick-up truck bed like a puzzle. These are removable because they are small, and can be adjusted simply by omitting some of the weights. These designs appear to have solved the aforementioned ballast devices' shortcomings, but they have their own defects.

First of all, the puzzle devices have too many individual pieces to handle when removing the individual pieces in order to haul a payload. Removal and storage of a weight system should be convenient for the vehicle owner. A smaller number of pieces at a manageable weight would make the puzzle pieces more convenient to remove and store. Second, there appears no clear method for holding the pieces in place in the truck bed. In the puzzle devices, although in each the several pieces are locked together to prevent them from sliding laterally in the cargo bed, the danger still exists of vertical movement of the pieces, thus, lifting them from their interlocked positions to freely slide across the truck bed and possibly projecting them out of the bed in the case of an accident or sudden stop. Third, adjusting the weight is difficult since the distribution of the weight with respect to the wheels changes when the puzzle pieces are removed. Finally, similar to the ballast devices and other variations of them, the puzzle devices are too expensive to produce. The market for this type of product is primarily aimed at the private truck owner and middle to low income consumer and, as a result, demands a low cost for its success.

Consequently, a need exists for a versatile and convenient device that provides extra weight in cargo areas in motor vehicles at a low cost.

SUMMARY OF THE INVENTION

The present invention seeks to improve means used to add weight over the power driven wheels of a motor vehicle for improving traction and handling by providing a removable and convenient holding container for use in the floor space of normal cargo areas of motor vehicles. The present invention allows for easy adjustment of weight, convenient installation, removal and storage, non-obstructive operation, secure fastening to cargo floor, low cost, proper distribution of weight over a vehicle's power driven wheels, and year-round usability at a low cost. The present invention also could be used as a convenient contained space for assorted products and even tradesman's tools for out of the way storage that is safe and inconspicuous to thieves.

The present invention provides an apparatus for holding material in a motor vehicle having space for holding cargo located over driven wheels to provide additional pressure exerted on driving surface by driven wheels for secure contact and thus improved vehicle traction and handling.

The apparatus is composed of a plurality of elongated containers each with a predetermined rectangular cross-section and an inner peripheral surface with sidewalls and hold down surfaces. Each elongated container is cut to a predetermined length. Furthermore, each elongated container is constructed such that when at least two container means are juxtaposed longitudinally parallel to one another, the adjacent hold down surfaces are interrupted by the sidewalls of the elongated containers.

The apparatus further includes at least one removable end cover for each container for containing material held therein. Each end cover has a planar surface generally perpendicular to and complimentary in shape with the inner peripheral surface of the elongated container and is generally parallel to the cross-section. The end cover also includes a peripheral sidewall flange extending from the planar surface to one end of the elongated container and a stopping flange located on an end edge of the peripheral sidewall flange and extending over an end edge of the sidewalls for limiting the insertion of the end cover.

In the preferred embodiment, the apparatus has first and second end covers with an end cover located at each end of each container. Also included in the apparatus is a first and a second elongated bracket for engagement with the first and second end covers respectively and fastening bolts for securing the first and second bracket onto the floor area with first and second apertures located on the floor area for positively engaging the containers and for preventing the containers from moving about the floor area. The first and second brackets each have a first surface including third apertures located and evenly spaced along the first surface allowing for the fastening bolts to pass through the third apertures and be received into the first and second apertures formed in the floor area adjacent the respective first and second ends of each container.

Each of the first and second brackets further include a securing flange and an offset flange. The securing flange is generally parallel to the first surface and extends from the first surface over the peripheral sidewall flange of the elongated container and up to the planar surface of the end cover for holding one end of the elongated containers with the installed end cover onto the floor. The offset flange is of a height H that is sufficient to offset the securing flange and to allow the securing flange to overlap the peripheral sidewall flange installed in the elongated container. The offset flange extends along the entire longitudinal length of the first and second bracket. The peripheral sidewall flange receives the first and second bracket such that, when at least two elongated containers are juxtaposed with longitudinal axes parallel to one another, the peripheral sidewall flange of the adjacent containers will align to create a series of vertically extending sidewalls extending from a unified surface of the adjacent containers.

Finally included in the apparatus of the preferred embodiment are bolts installed through the first and second apertures in the cargo floor area. The bolts pass upward through the third apertures for receiving fastening nuts onto the bolts. The bolts include angularly shaped shafts for securing a lower end of the bolt onto the bottom side of the cargo floor area for convenient fastening of the bolt and fastening nuts assembly thereby allowing for manual installation of the apparatus from the top side of the cargo surface. Various other methods of fastening generally known by those skilled in the art are also possible and can be used in conjunction with the present invention without departing from the spirit and the scope of the present invention.

Other features, advantages and modifications of the present invention will become apparent to those skilled in the art after reading the description of the preferred and alternative embodiments below in conjunction with examination of the drawings.

BRIEF DESCRIPTION OF THE DRAWINGS

The present invention is disclosed with respect to the accompanying drawings wherein like parts are referred to with like reference numerals throughout the various views, and wherein.

DESCRIPTION OF THE PREFERRED AND ALTERNATIVE EMBODIMENTS

Figure 1:
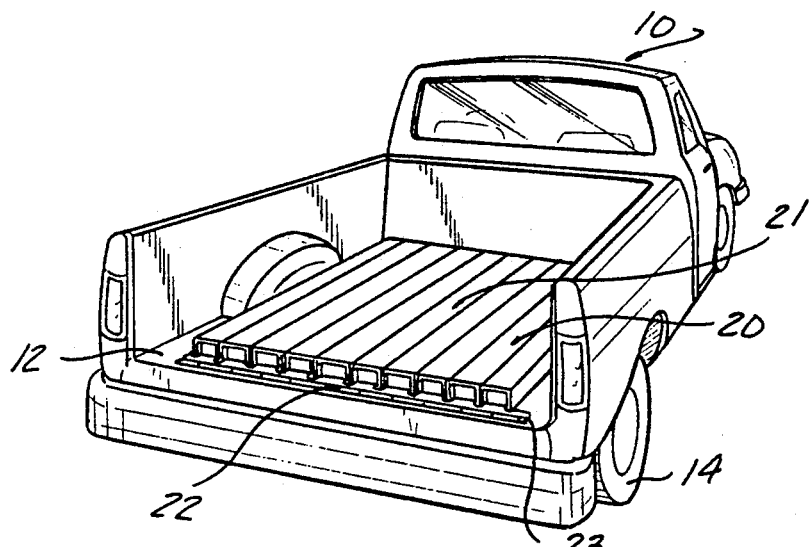
FIG. 1 shows the truck weight system installed in the vehicle.

Now referring to the drawings and more particularly to FIG. 1, elongated container means 20 are shown installed in vehicle 10 over cargo floor area 12 held down by securing means 22. The present invention provides weight in the cargo floor area 12 without obstructing the cargo floor area from normal use. The additional weight provides extra pressure to the contact area of the tires 14 with the ground, thus providing improved traction and handling. The system further provides a flat planar surface 21 for convenient storage of cargo and protection of the vehicle floor area and a closed container area for storing material. In the preferred embodiment, the securing means 22 includes first and second brackets which hold the elongated container means 20 in place preventing movement about the cargo floor area while in transport. Although the second bracket is not shown, its structure and installation is identical to that of the first bracket 23 and is located on the opposite end of the elongated container means 20 from the first bracket 23.

Figure 2:
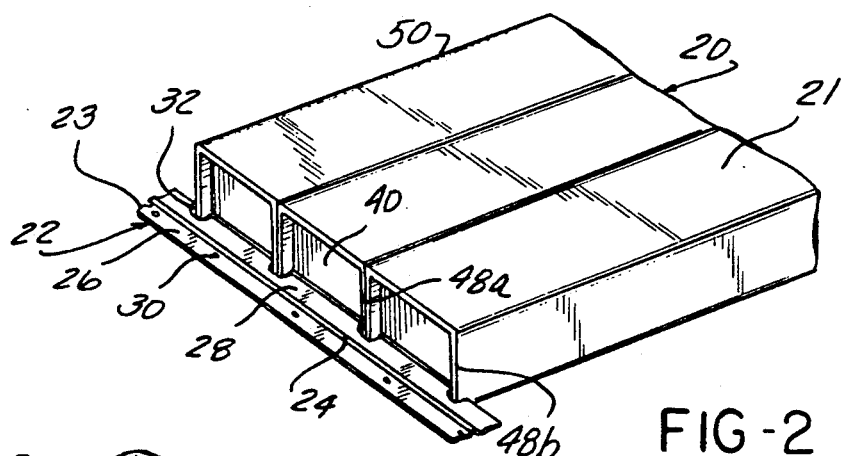
FIG. 2 shows a detailed view of the elongated containers with the installed end covers and bracket.

FIG. 2 shows a more detailed view of the elongated container means 20 in combination with the first hold down bracket 23. The elongated container means 20 preferably includes a plurality of elongated containers 50. The containers 50 are cut to a predetermined length to fit the floor area 12 of the vehicle 10. Although the illustration of the preferred embodiment shows the containers 50 with a generally rectangular cross-section, other cross-sectional shapes are possible and use of such alternative shapes for the containers 50 would not depart from the spirit and scope of the present invention. At least one, and preferably two end covers 40 are provided for each container 50. At least one, and preferably two hold down brackets 23 are provided to engage the respective end covers at each end of the containers 50. The first hold down bracket 23 includes a first portion 26 and a second portion 29 connected to one another through offset flange 24 and are generally parallel to each other. First apertures 30 are located longitudinally and evenly spaced along the first portion of each bracket 23. The bracket 23 is installed onto cargo area floor 12 by hold down bolts 34 passing through first apertures 30 formed in the first portion 26 of bracket 23. The bolts 34 engage with the cargo area floor 12 after passing through second apertures (not shown) formed in the floor 12. The bolt 24 is secured with fastening nut 25. Although the illustration of the preferred embodiment shows a bolt and nut assembly, other fastening means are possible and use of alternative fastening devices would not depart from the spirit and scope of the present invention, provided the containers are securely fastened with respect to the floor of the vehicle. The bracket further includes offset flange 24 shown generally perpendicular to first portion 26, the offset flange 24 being of sufficient height to offset the securing flange 28 vertically, upwardly with respect to the floor to operably engage the hold down surface along a longitudinal length of each bracket, the first portion 26 and second portion 29 being generally parallel to each other. The offset flange 24 spaces the second portion. 29 vertically from the floor 12 by a distance generally equal to the combined wall thickness of the container means 20 adjacent the end to be secured. A plurality of securing flanges 28 extend outwardly from the offset flange 24 and into the respective end covers 40 to overlap the peripheral sidewall flanges 46. The securing flanges 28 extending along bracket 23 are interrupted by recesses 32 for receiving tandem extending vertical surfaces 48a when the containers are installed juxtaposed and for receiving the singular peripheral sidewall flange 48b when the elongated containers 50 are installed without another like container adjacent it. Each singular and tandem extending vertical surface being disposed in recesses 32 when the present invention is installed on the floor 12 of a motor vehicle.

Figure 3:
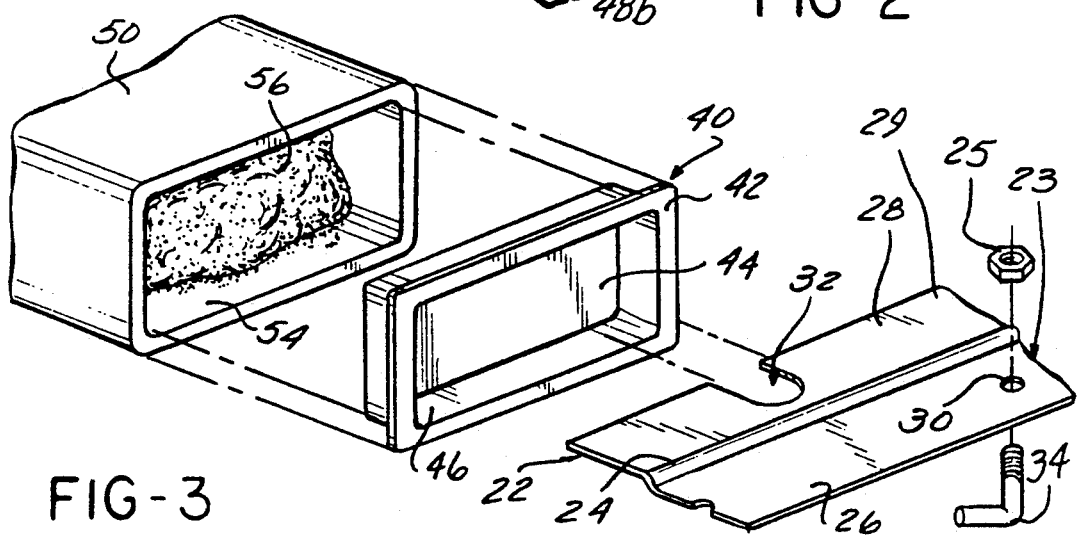
FIG. 3 shows an exploded view of the elongated container with material inside the container normally closed by the end cover, and held in place by the bracket and securing bolts.

FIG. 3 shows an exploded view of the elongated container 50 containing weighted material 56. End cover 40 closes the open end of the container 50. Hold down bracket 23 is connected to the floor 12 with installation bolts 34. The elongated container 50 has an inner peripheral surface 54. The inner peripheral surface 54 defines a portion of the longitudinally extending hollow compartment within each container 50 which holds weighted material 56. At least one end of the hollow compartment, and preferably both ends, are closed by removable end covers 40. If only one removable end cover 40 is provided, the opposite end of the container 50 is formed with one integrally closed end or is provided with a non-removable end cover. Each removable end cover 40 has an end wall 44 complementary in shape with the inner peripheral surface 54 of the container 50. A longitudinally extending flange 46 extends from the periphery of the end wall 44 outwardly toward the end of the container 50. A portion of the longitudinally extending flange 46 acts as a hold down surface for securing flange 28. The securing flange 28 overlaps flange 46 to secure each container 50 with respect to the floor. When at least two containers, with installed end covers, are juxtaposed longitudinally parallel to each other, the adjacent hold down surfaces of the flanges 46 of each juxtaposed container are interrupted by vertically extending and abutting sidewalls of the two adjacent containers. Although the illustration of the preferred embodiment shows the hold down surface formed on an extending flange 46 other locations for the hold down surface are possible and use of alternative locations for holding the containers down with respect to the floor would not depart from the spirit and scope of the present invention. A radially extending stop flange 42 is formed at the outer end of the flange 46 for obstructing engagement with the end of the peripheral sidewall 54 of the container 50. When the end cover 40 is installed, the end cover's surface 44 is complementary in shape with the inner peripheral surface 54 thus holding the material 56 which provides weight for the vehicle in the elongated container 50 without spilling. Also, the end cover's surface 44 is generally perpendicular with the inner peripheral surface 54 and parallel with the container's 50 cross-section. Furthermore, the end cover 40 includes stopping flange 42 which, when the end cover is installed, overlaps and rests upon elongated container's cross-sectional surface edge and thus limits the longitudinally inward movement of the end cover into the elongated container. Also shown in more detail in FIG. 3 is bracket 23. As previously described bracket 23 includes first portion 26 integrally connect with second portion 29 through offset flange 24 of sufficient height to offset the securing flange 28 vertically, upwardly with respect to the floor to operably engage the hold down surface along a longitudinal length of each bracket, the first portion 26 and second portion 29 being generally parallel to each other. Securing flanges 28 extend outwardly from offset flange 24 and are separated from each other by recesses 32. Bolt 34 passes through aperture 30 in the first portion for securing the plurality of containers 50 to the floor 12.

While the invention has been described in connection with what is presently considered to be the most practical and preferred embodiment and alternative embodiments presently contemplated, it is to be understood that the invention is not to be limited to the disclosed embodiments, but on the contrary, is intended to cover various modifications and equivalent arrangements included within the scope and spirit of the appended claims, which scope is to be accorded the broadest interpretation so as to encompass all such modifications and equivalent structures as permitted under current law.

What is claimed is:

1. An apparatus for adding weight to a vehicle to improve traction, the vehicle having a floor, the apparatus comprising:
    a plurality of elongated container means having at least one sidewall defining an enclosed, hollow compartment for holding material to add weight to the vehicle, each of the container means having first and second ends and a hold down surface;
    securing means for releasably attaching each container means to the floor of the vehicle, the securing means engageable with said hold down surface of each container means;
    said elongated container means comprising an elongated container having a predetermined rectangular cross-section and sidewalls defining an inner peripheral surface; and
    at least one removable end cover with a planar surface generally perpendicular to and complimentary in shape with the inner peripheral surface of said elongated container and generally disposed parallel to said cross-section.

2. The apparatus of claim 1 further comprising:
    when at least two container means are juxtaposed longitudinally parallel to one another, adjacent hold down surfaces are interrupted by abutting sidewalls of the two adjacent container means.

3. The apparatus of claim 1 further comprising:
    recess means in at least one of the first and second ends of each container means defining the hold down surface spaced from the floor of the vehicle.

4. The apparatus of claim 1 wherein said securing means further comprises:
    first and second receiving means respectively formed on each end of the container means and defining said hold down surface;
    first and second elongated brackets for engagement with said first and second receiving means, said first and second brackets each having a first portion including means defining first apertures located longitudinally evenly spaced along the first portion of each bracket, said first and second brackets further including a securing flange and an offset flange, said securing flange generally parallel to said first portion of each bracket and extending from the first portion over said hold down surface, said offset flange of sufficient height to offset said securing flange vertically, upwardly with respect to said floor to operably engage said hold down surface along a longitudinal length of each bracket, said securing flange engaging the hold down surface of said receiving means for holding one end of said container means stationary with respect to said floor;

fastening means for securing the first and second brackets onto the floor; and said first apertures allowing passage of said fastening means through each bracket for anchored connection with respect to said floor.

5. The apparatus of claim 1 wherein each of said elongated container means further comprises:

an elongated container having a predetermined rectangular cross-section and sidewalls defining an inner peripheral surface;

at least one removable end cover with a planar surface generally perpendicular to and complimentary in shape with the inner peripheral surface of said elongated container and generally disposed parallel to said cross-section, said end cover further including a peripheral sidewall flange extending longitudinally, outwardly from said planar surface of said end cover toward an end of said container and a stopping flange located on an end edge of said peripheral sidewall flange and extending radially to obstructively engage and end edge of said sidewall for limiting longitudinal insertion of said end cover within said container; and a portion of said sidewall of said elongated container adjacent another like container, such that when two containers are juxtaposed longitudinally parallel to one another said portion of said sidewall of each respective adjacent container align to create a series of vertically extending and abutting sidewall surfaces extending upwardly from each hold down surface, said series of sidewall surfaces further defined by the peripheral sidewall flanges and stopping flanges of adjacent end covers.

6. The apparatus of claim 1 wherein said securing means further includes bolts connected to said floor extending upward for engagement with said securing means for receiving nuts onto said bolts, said bolts including angularly bent shafts for securing a lower end of each bolt with respect to a bottom side of said floor for allowing manual installation from a top side of said floor.

7. The apparatus of claim 1 wherein said elongated container is cut to a predetermined length.

8. The apparatus of claim 1 wherein said at least one end cover further comprises a peripheral sidewall flange extending longitudinally outwardly from said planar surface of said end cover toward and end of said container and a stopping flange located on an end edge of said peripheral sidewall flange and extending radially outwardly to obstructively engage an end edge of said container for limiting longitudinal insertion of said end cover into said container.

9. An apparatus for holding material in a motor vehicle having a floor with space for holding cargo located over driven wheels to provide additional pressure exerted on a driving surface by said driven wheels for secure contact and thus improved vehicle traction and handling, the apparatus comprising:

a plurality of elongated container means having sidewalls defining an enclosed, hollow compartment for holding material to add weight to the vehicle, each of the container means having first and second ends and a hold down surface formed adjacent at least one end;

bracket means for engagement with said hold down surface formed adjacent said one end of each container means; and fastening means for securing the bracket means onto the floor, such that the bracket means positively engages the container means to prevent the container means from moving with respect to the floor;

wherein said fastening means include bolts connected to said floor extending upward for engagement with said bracket means for receiving nuts onto said bolts, said bolts including angularly bent shafts for securing a lower end of each bolt with respect to a bottom side of said floor for allowing manual installation from a top side of said floor.

10. The apparatus of claim 9 wherein said elongated container means further comprises an elongated container having a predetermined rectangular cross-section and wherein said sidewalls define an inner peripheral surface.

11. The apparatus of claim 10 wherein said elongated container is cut to a predetermined length.

12. The apparatus of claim 10 wherein said elongated container further comprises at least one removable end cover with a planar surface generally perpendicular to and complimentary in shape with the inner peripheral surface of said elongated container and generally disposed parallel to said cross-section.

13. The apparatus of claim 12 wherein said at least one end cover further comprises a peripheral sidewall flange extending longitudinally outwardly from said planar surface of said end cover toward an end of said container and a stopping flange located on an end edge of said peripheral sidewall flange and extending radially outwardly to obstructively engage an end edge of said container for limiting longitudinal insertion of said end cover into said container.

14. The apparatus of claim 9 further comprising:

when at least two container means are juxtaposed longitudinally parallel to one another, adjacent hold down surfaces are interrupted by adjacent vertically extending and abutting sidewalls of the adjacent container means.

15. The apparatus of claim 9 wherein said bracket means further comprises:

first and second hold down surfaces formed on said first and second ends respectively of said container means;

first and second elongated brackets for engagement with said first and second hold down surfaces respectively, said first and second brackets each having a first portion with first apertures located longitudinally evenly spaced along the first portion, said first and second brackets further including a securing flange and an offset flange, each securing flange generally parallel to said first portion and extending from the first portion over said hold down surface of said elongated container means for holding one end of said elongated container with respect to said floor, said offset flange of sufficient height to offset said securing flange vertically upwardly from said floor to allow the securing flange to overlap said hold down surface of said elongated container, said offset flange extending along an entire longitudinal length of each of said first and second brackets; and fastening means for securing the first and second brackets onto the floor, such that each bracket positively engages the container means and prevents the container means from moving with respect to the floor, said fastening means passing through the first apertures in each bracket and connected to the floor.

16. The apparatus of claim 9 wherein said elongated container means further comprises:

an elongated container having a predetermined rectangular cross-section and sidewalls defining an inner peripheral surface;

at least one removable end cover with a planar surface generally perpendicular to and complimentary in shape with the inner peripheral surface of said elongated container and generally disposed parallel to said cross-section, said end cover further including a peripheral sidewall flange extending longitudinally outwardly from said planar surface of said end cover toward an end of said container and a stopping flange located on an end edge of said peripheral sidewall flange and extending radially outwardly to obstructively engage an end edge of said container for limiting longitudinal insertion of said end cover in said container; and a portion of said sidewall of said elongated container adjacent another like container, such that when two containers are juxtaposed longitudinally parallel with respect to one another said portion of said sidewall of each respective adjacent container align to create a series of vertically extending and abutting sidewall surfaces extending upwardly from the hold down surface, said series of sidewall surfaces further defined by the peripheral sidewall flanges and Stopping flanges of adjacent end covers.

17. An apparatus for holding material in a motor vehicle having a floor with space for holding cargo located over driven wheels to provide additional pressure exerted on a driving surface by said driven wheels for secure contact and thus improved vehicle traction and handling, the apparatus comprising:

a plurality of elongated containers, each container having a predetermined rectangular cross-section and sidewalls defining an inner peripheral surface, each container cut to a predetermined longitudinal length and having first and second longitudinal ends;

a removable end cover for each longitudinal end of each container, each end cover having a planar surface generally perpendicular to and complimentary in shape with the inner peripheral surface of said elongated container and generally disposed parallel to said cross-section, each end cover including a peripheral sidewall flange extending longitudinally outwardly from said planar surface toward one longitudinal end of said elongated container and a stopping flange extending radially outwardly from an end edge of said peripheral sidewall flange to obstructively engage an end edge of said container for limiting longitudinal insertion of said end cover into said container, a portion of said peripheral sidewall flange of each end cover defining said hold down surface, such that when at least two elongated containers are juxtaposed longitudinally parallel to one another the hold down surface of each respective adjacent end cap will align to create a series of hold down surfaces extending longitudinally inwardly from a common end surface of the aligned adjacent containers and adjacent hold down surfaces are interrupted by vertically upwardly extending peripheral sidewall flanges and stopping flanges of adjacent end covers;

first and second elongated brackets for engagement with said hold down surfaces of said end covers at each end of said containers, said first and second brackets each having a first portion including first apertures located longitudinally evenly spaced along the first portion, said first and second brackets further including a securing flange and an offset flange, said securing flange generally parallel to said first portion and extending from the first portion to engage the hold down surfaces of adjacent containers for holding one end of said elongated containers with the installed end covers stationary with respect to said floor, said offset flange of sufficient height to offset said securing flange to overlap said peripheral sidewall flanges and stop flanges of said end covers installed in said elongated containers, said offset flange extending along an entire longitudinal length of said first and second brackets; and fastening means for securing the first and second brackets onto the floor for positively engaging the containers with the first and second brackets for preventing the containers from moving with respect to the floor, said fastening means passing through the first apertures of the first and second brackets and connected to the floor, said fastening means including bolts connected to the floor of the vehicle and extending vertically upwardly through said first apertures of the first and second brackets for receiving nuts onto said bolts, said bolts including angularly bent shafts for securing a lower end of the bolts with respect to a bottom side of said floor for allowing manual installation from a top side of said floor.

* * * * *

UNITED STATES PATENT AND TRADEMARK OFFICE
CERTIFICATE OF CORRECTION

PATENT NO. : 5,330,227
DATED : July 19, 1994
INVENTOR(S) : Alger J. Anderson

It is certified that error appears in the above-indentified patent and that said Letters Patent is hereby corrected as shown below:

Column 7, line 36, please delete "and" and insert --an--.

Column 7, line 62, please delete "and" and insert --an--.

Signed and Sealed this

Twenty-seventh Day of September, 1994

Attest:

BRUCE LEHMAN

*Attesting Officer*     *Commissioner of Patents and Trademarks*